United States Patent

Nakagawa

[11] 3,902,982
[45] Sept. 2, 1975

[54] APPARATUS FOR MEASURING RESIDUAL CHLORINE

[75] Inventor: Masuo Nakagawa, Nishinomiya, Japan

[73] Assignee: New Cosmos Electric Company Limited, Osaka, Japan

[22] Filed: Mar. 20, 1974

[21] Appl. No.: 453,022

[30] Foreign Application Priority Data
Mar. 31, 1973 Japan............................ 48-38925[U]
June 4, 1973 Japan............................ 48-65986[U]
Aug. 24, 1973 Japan............................ 48-99980[U]

[52] U.S. Cl.............. 204/195 R; 204/212; 204/222; 204/286; 204/297 R
[51] Int. Cl. .......................................... G01n 27/46
[58] Field of Search ............. 204/1 T, 195 R, 195 G

[56] References Cited
UNITED STATES PATENTS
2,401,287  5/1946  Yant et al. ...................... 204/195 R
2,415,067  1/1947  Wallace ......................... 204/195 R
2,585,059  2/1952  Wallace ......................... 204/195 R
3,028,317  4/1962  Wilson et al. ................... 204/195 R
3,413,199  11/1968 Morrow .......................... 204/195 R
3,449,233  6/1969  Morrow .......................... 204/195 R Primary Examiner—T. Tung
Attorney, Agent, or Firm—Wenderoth, Lind & Ponack

[57] ABSTRACT

An improved portable apparatus for measuring residual chlorine in water, for instance city water, enables easy and quick measurement, said apparatus comprising:

a transparent container for the water, the container having a hole for pouring in and draining out the water, a conically driven rod which is driven in the container and has a first electrode, i.e., common electrode of gold or platinum near its moving end to be agitated in the water;

at least one second electrode of silver and/or copper provided on the inner wall of the container or on the agitator rod, a driving means for driving the conically driven rod; and an ammeter for indicating a galvanic current between the first electrode and the second electrode.

The measured concentration is given directly on the ammeter.

6 Claims, 6 Drawing Figures

APPARATUS FOR MEASURING RESIDUAL CHLORINE

BACKGROUND OF THE INVENTION

This invention relates to a handy apparatus capable of measuring residual chlorine in the water.

In general, in treated water, for instance city water, free residual chlorine is contained in the form of HClO and/or ClO⁻, and combined residual chlorine is contained in the form of $NH_2Cl$, $NHCl_2$ or in combinations of nitrogen in organic substance with the chlorine. The total of the above-mentioned free and combined residual chlorine is called the "total residual chlorine."

Hitherto, for measuring the concentration of the residual chlorine, it has been customary to employ an ortho-tolidine colorimeter (or chromometer), wherein the concentration of the residual chlorine was obtained through colorimetry of the ortho-tolidine chloric acid solution prepared by adding ortho-tolidine chloric acid into the tested water. In such conventional process, the colorimetry is influenced by personal differences, and the measured results accordingly vary. The measurements take a long time when repeated for minimizing such variations. Moreover, the ortho-tolidine, which is used in the conventional method has become recently controlled as a possible cancer-triggering substance. Therefore, a reliable and safe measuring method in place of the conventional ortho-tolidine colorimetry has been sought.

SUMMARY OF THE INVENTION

This invention provides a novel, useful, easily and quickly operable, precise, stable and handy apparatus for measuring the residual chlorine in the water.

DETAILED DISCLOSURE OF THE INVENTION

First Example

Figure 1:
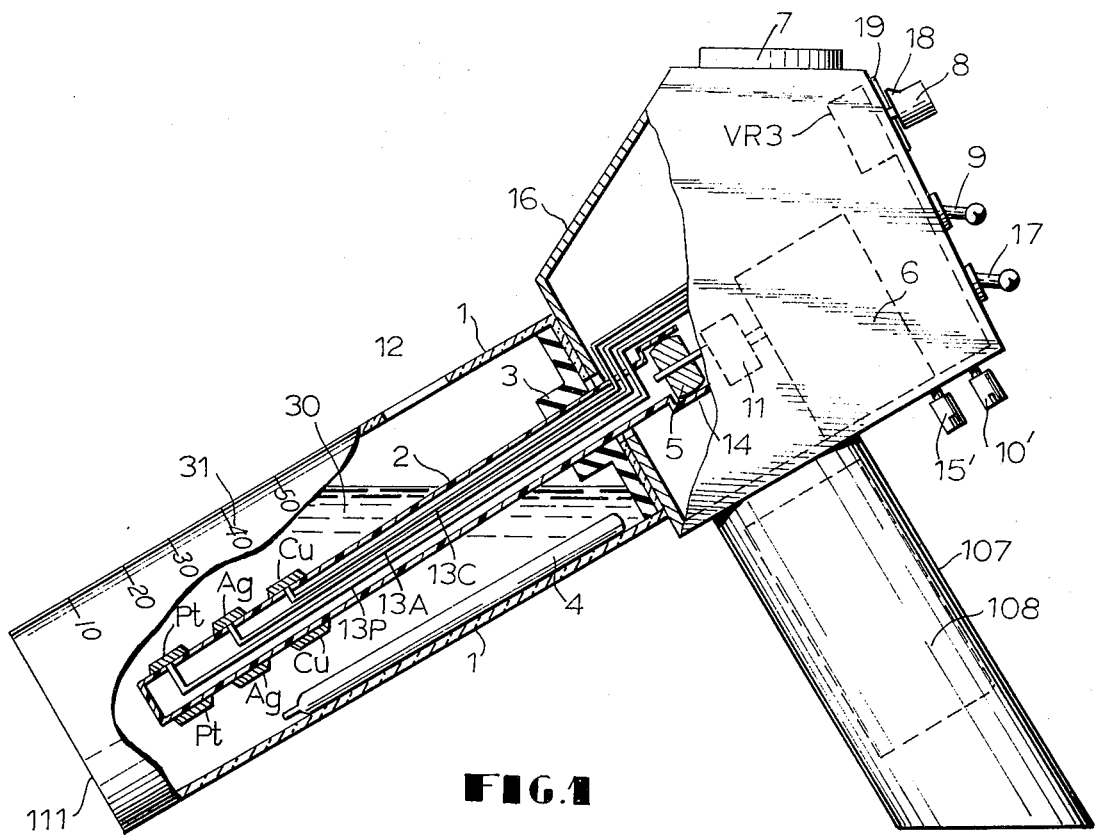
FIG. 1 is a partly sectional side view of a first example of the present invention.

In FIG. 1, a transparent cylindrical container 1 having a hole 12 is made of glass or transparent plastic resin and is fixed to one face of a case 16, so that light incident on water being tested in the container 1 causes light-reduction of AgCl. The free end 111 of the container 1 is sealed, and a moving rod, conically driven rod 2 extends from the case 16 into the container 1. A water-sealing elastic packing 3 of rubber or like material is provided at the interface to prevent the water from seeping into the case 16 from the container 1 and to support the rod 2 in a rotatable manner.

The rod 2 is made of a water-resistant-and-insulating material in the shape of a pipe with its free end, that is, the end in the container, closed. The pipe has three electrodes near its free end. A common electrode Pt of a metal which is nobler than silver, namely platinum or gold, or of carbon is provided nearest to the free end of the rod 2, a silver electrode Ag in the middle, and a copper electrode Cu is provided farthest from the free end. These electrodes are shaped as rings surrounding the rod 2, and the electrodes have respective lead-wires 13P, 13A and 13C connected through the rod to an electric circuit provided in the case 16. The platinum electrode Pt is a common electrode, and either of the other two electrodes Ag and Cu is used alternatively together with the platinum electrode Pt to form a voltaic cell. The silver electrode Ag is used for measuring free residual chlorine, and the copper electrode Cu is used for measuring total residual chlorine.

The silver electrode Ag and/or the copper electrode Cu need not be fixed on the rotating rod 2, but may be fixed to the container 1.

The other end of the rod, the end in the case 16, has an engaging recess 14, in which a linking ball 5 is engaged. The linking ball 5 is linked to an eccentric cam 11 which is rotated by an electric motor 6 of substantially constant speed and fed by a battery 108 provided in a handle for gripping or grip 107. When the motor 6 is activated by turning a knob 17 so as to close a switch (not shown) in the motor circuit, the motor 6 rotates the cam 11 and the linking ball 5 drives the engaging recess 14 in a circle defined by the cam 11. Accordingly, the rod, which is pivotally supported by the packing 3, is conically driven so as to agitate the tested water 30 in the container 1 at a constant speed.

On the outer face of the case 16 are provided an ammeter 7 for indicating the measured chlorine concentration, a dial 19 and a knob 8 with pointing tip 18 of a variable resistor VR3 for water-temperature compensation, a pair of semi-fixed knobs 10' and 15' of variable resistors VR1 and VR2 for adjusting the indication ranges to the calibrated measurement ranges of the free residual chlorine concentration and the total residual chlorine concentration, respectively. A knob 9 of interlocked change-over switches SW1 and SW2 for switching the measurement between the above-mentioned "free" and "total" is also provided on the case 16. In the container 1 a thermometer 4 is provided for measuring temperature of the tested water 30.

Figure 2:
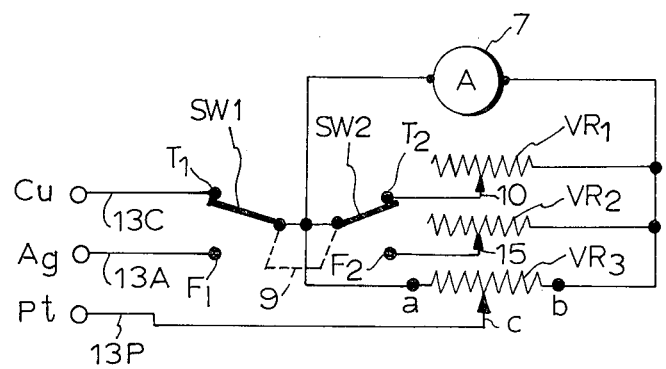
FIG. 2 is a circuit diagram of the apparatus of FIG. 1.

The circuit of the above-mentioned apparatus is wired as shown in FIG. 2, wherein the common electrode Pt is connected to the sliding terminal c of the variable resistor VR3, both ends a and b of which are connected across both ends of the ammeter 7. The silver and copper electrodes are connected to the fixed contacts T1 and F1, respectively, of a first switch SW1 of the interlocked switches and a moving contact of the switch SW1 is connected to one terminal of the ammeter 7. Either one of the variable resistors VR1 and VR2 are alternatively connected between both terminals of the ammeter 7 through fixed contacts of a second change-over switch SW2 of the interlocked switches.

Preliminary Treatments of Tested Water

Different preliminary treatments of tested water are made for measurements of "total" and "free" residual chlorine concentrations, respectively.

1. Pre-treatment for Total Residual Chlorine Concentration

The tested water is poured into the container 1 to a sufficient level to immerse the three electrodes when the container is tilted as shown in FIG. 1, then known Michaelis buffer solution, which consists mainly of acetic acid and sodium acetate of 0.1 normal, is added to make the water pH approximately pH=4. Also, a KI solution of 50 gr/l concentration is added. The necessary amount of the KI solution is about 0.003 volume for 1 volume of the tested water. In adjusting the pH value, the amounts of the tested water, as well as the added buffer solution can be easily made by utilizing a measuring scale 31 on the container 1. After the addition of KI, the following chemical reactions take place:
For the free chlorine:

$$HOCl + 2I^- + H^+ \rightarrow I_2 + H_2O + Cl^- \qquad (1).$$

$$OCl^- + 2I^- + 2H^+ \rightarrow I_2 + H_2O + Cl^- \qquad (2).$$

For the combined chlorine:
$$NH_2Cl + 2I^- + 2H^+ \rightarrow I_2 + NH_4Cl \qquad (3).$$

$$NHCl_2 + 4I^- + 3H^+ \rightarrow 2I_2 + NH_4Cl + Cl^- \qquad (4).$$

By contacting the resultant $I_2$ with the common electrode Pt, each $I_2$ takes two electric charges $2e$ and the following reaction takes place:
$$I_2 + 2e \rightarrow 2I^- \qquad (5).$$

At the same time, another $I^-$ of the same number with the above-mentioned $2I^-$ in the equation (5) gives electric charges $2e$ to the copper electrode Cu, and accordingly, the following reaction takes place:
$$2I^- + 2Cu \rightarrow 2CuI + 2e \qquad (6).$$

That is, the current is induced between the common electrode Pt and the copper electrode Cu.

2. Pre-treatment for Free Residual Chlorine Concentration

The tested water is also poured into the container similarly to the above-mentioned way for total residual chlorine measurement, but Michaelis buffer solution is added to make the water pH approximately pH=5. In order to obtain such pH value, the buffer solution is added in a volume ratio of 2 parts for 1,000 parts of the water.

Then, by means of the above addition of the buffer solution the ion concentration of $H^+$ increases, and therefore, the free residual chlorine almost becomes hypochlorous acid as shown by the following reaction:
$$H^+ + OCl^- \rightarrow HOCl \qquad (7).$$

At the common electrode Pt, the hypochlorous acid reacts as:
$$HOCl + H^+ + 2e \rightarrow Cl^- + H_2O \qquad (8).$$

and at the silver electrode Ag, the $Cl^-$ ions react as:
$$Ag + Cl^- \rightarrow AgCl + e \qquad (9).$$

That is, the charge $e$ flows between the common electrode Pt and the silver electrode Ag.
Incidentally, the resultant AgCl in the equation (9) is reduced by light coming through the transparent container wall 1.

Concentration measurement is made as follows for the above-mentioned pre-treated water:

1. Total residual Chlorine Concentration

By turning the knob 17, the motor rotates and the rod 2 is driven at constant speed in a conical way to stir the above-mentioned pre-treated water 30 of pH=4. By means of the stirring, the concentration of the $I_2$ in the water becomes uniform.

A very thin layer of the water, wherein the water moves along the common electrode Pt, is formed around the common electrode Pt, though the rod is rotated in the water. In the thin layer, the reaction shown by the above-mentioned equation (5) takes place, and consumes the $I_2$. Therefore, the $I_2$ concentration in the thin layer becomes lower than in the water outside the thin layer. Moreover, since the water moves along the common electrode Pt in the thin layer, the thin layer has a concentration slope in the direction normal to the surface of the common electrode Pt. This concentration slope is dependent on the $I_2$ concentration outside the thin layer and on the layer thickness. The layer thickness is dependent on the relative speed of the rod 2 in the water, but the speed is a predetermined constant. Therefore, the above-mentioned concentration gradient is dependent only on the $I_2$ concentration outside the layer, which is dependent on the total of the resultant $I_2$ of equations (1) through (4), hence dependent on the concentration of the total residual chlorine. The galvanic current between the electrodes is proportional to the concentration gradient. Therefore, when the interlocked switches SW1 and SW2 are thrown to the T1 and T2 sides, respectively, the total residual chlorine concentration is obtainable by measuring the current between the common electrode Pt and the copper electrode Cu.

The variable resistor VR1 for calibration for the total residual chlorine concentration and the variable resistor VR2 for calibration for the free residual chlorine concentration are of semi fixed type, and once appropriately set, thereafter there is generally no need of re-adjusting.

Then, by reading out the temperature of water indicated on the thermometer 4, the knob 8 of the variable resistor VR3 is adjusted such that the pointing tip 18 points at the same figure of temperature on the dial 19 with that read out from the thermometer 4. By means of the above-mentioned adjustment of the knob 8, the temperature dependency of the measured result, due to the temperature dependency of the diffusion of the $I_2$, is compensated. This compensation can be made by empirically calibrating the dial 19.

As above-mentioned, the pre-treated tested water becomes an electrolyte, the common electrode Pt a cathode, and the electrode Cu an anode, and a galvanic electromotive force is induced between both electrodes. And therefore, according to the reaction of the equation (5), current proportional to the number of ionized $I^-$ at the common electrode Pt flows through an outer circuit connected to the electrodes. Therefore, the total residual chlorine concentration is indicated by directly readable figures on the ammeter 7.

Now defining that the total current flowing through the outer circuit to be $It$, resistance of the ammeter 7 to be $Rm$, the effective resistance of the variable resistance to be R1, and the resistance between the terminals $a$ and $b$ and the resistance between the terminals $a$ and $c$ to be R3 and R$a$, respectively, then the current I$m$ flowing through the ammeter 7 is given by the following equation:

$$Im = \frac{R1}{R3 \cdot (R1+Rm)+R1 \cdot Rm} \cdot Ra \cdot It \qquad (10).$$

By means of the current I$m$, the ammeter 7 indicates the preliminary calibrated concentration, thus enabling the measurement of the total residual chlorine concentration.

The equation (10) can be rewritten as follows:

$$Im = f(R1) \cdot Ra \cdot It \qquad \text{wherein,}$$

$$f(R1) = \frac{R1}{R3 \cdot (R1+Rm)+R1 \cdot Rm} = \text{constant}$$

As can be seen from the above equations, R3 and R$m$ are constants, and therefore, $f(R1)$ is a function dependent only on R1. Accordingly, $f(R1)$ is not dependent on the adjustment of the variable resistor VR3 for temperature compensation, but is dependent on only adjustment of VR1 for range calibration. The adjustment of the resistance R$a$ between the terminals $a$ and $c$ is used for compensating the effect of temperature dependency in diffusion coefficient of the I$_2$, hence, temperature dependency of the current It of the outer circuit. The above-mentioned adjustment does not affect the indication range. As mentioned above, the resistances R1 and R$a$ can be adjusted independently from each other in order to attain individual objects, without interferring with each other.

2. Free Residual Chlorine Concentration

The above-mentioned pre-treated water having pH=5 is poured into the container 1 and the interlocked switches SW1 and SW2 are thrown to the F1 and F2 sides, respectively, to select the silver electrode Ag and the variable resistor VR2 in the circuit. The variable resistor VR2 has previously been adjusted, as above-mentioned, for calibration of the range of indication.

Then, by turning the knob 17, the motor rotates to drive the rod 2. At the common and silver electrodes Pt and Ag the reactions shown by the equations (8) and (9) take place, transferring the electric charge $e$ and creating a current proportional to the free residual chlorine concentration in the outer circuit. As a result, the current flows through the ammeter 7 similarly to the above-mentioned case of the equation (6), and free residual concentration is indicated by directly readable figures on the ammeter 7.

The combined residual chlorine concentration is obtainable by subtracting the aforementioned free residual chlorine concentration from the aforemention total residual chlorine concentration.

Figure 3:
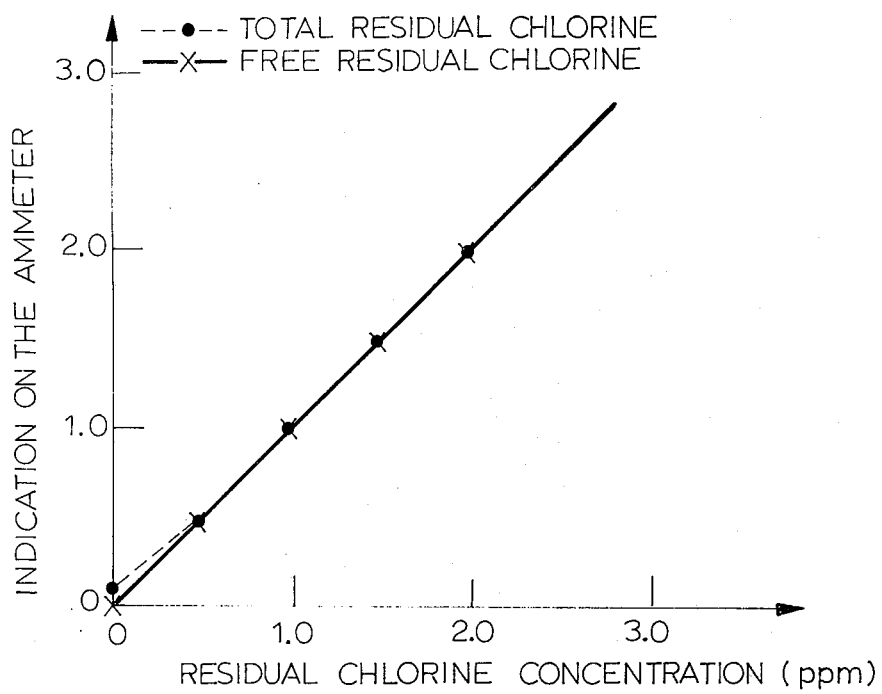
FIG. 3 is a graph showing the relation between the residual chlorine concentration (by parts per million, i.e., ppm, graduated on the abscissa) and the indication of the meter 7 (by parts per million, graduated on the ordinate)

FIG. 3 is a graph showing the relation between the total and free residual chlorine concentrations and the indication on the ammeter 7. In FIG. 3, the abscissa is graduated by total and free residual chlorine concentrations obtained by known Amperometric titration method, wherein a phenylarsenoxide solution is titrated until the current between the electrode becomes saturated. And the ordinate is graduated by the indications of the concentrations on the ammeter 7. In FIG. 3, dot marks show the values for total residual chlorine concentrations and the marks $x$ for free residual chlorine concentrations. As seen from the graph, the indication of the ammeter 7 has good linearity. Only differences appears in the total residual chlorine concentration on the ammeter 7 near the 0-concentration measured by the Amperometric titration method. This difference becomes far smaller when the copper electrode Cu is used for measurement of the total residual chlorine concentration than when a silver electrode is used.

On the other hand, for measurement of the free residual chlorine concentration, the silver electrode Ag is better in decreasing the difference from the result of titration method.

Figure 4:
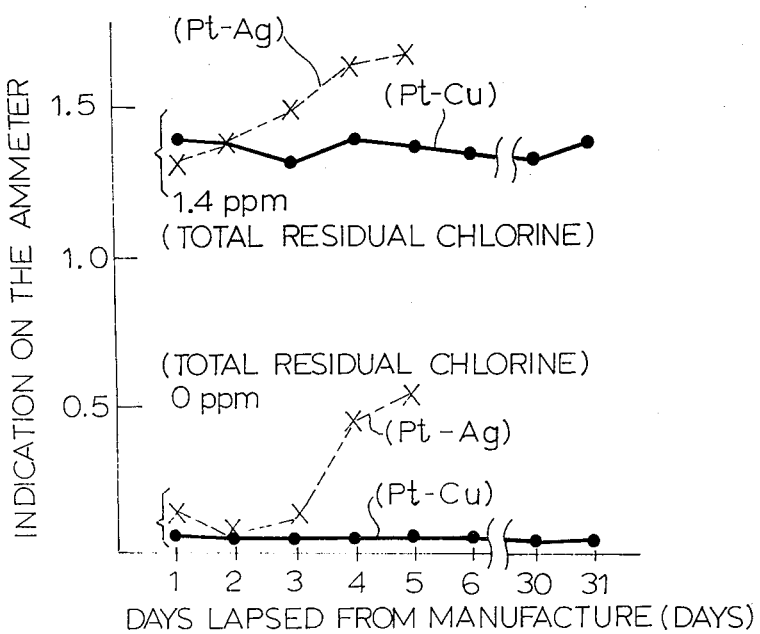
FIG. 4 is a graph showing the relation between the number of days lapsed from the manufacture of the apparatus (graduated on the abscissa) and the indication of the meter 7 (by ppm, graduated on the ordinate)

FIG. 4 shows the relation between the number of days since manufacture of the apparatus and the indication on the ammeter 7. The upper two curves show the cases wherein the total residual chlorine concentration measured by the titration method is 1.4 ppm, while the lower two curves show the cases where the concentration is 0 ppm. In FIG. 4, the solid lines depict the cases wherein the common electrode is of platinum and the other electrode is of copper, and the dotted lines depict the cases wherein the common electrode is of platinum and the other electrode is of silver. As seen from the graph, when the copper electrode is used, the indication on the ammeter 7 for 1.4 ppm concentration is stable after lapse of days, and retains the initial value unchanged. Also, when the copper electrode is used, the indication on the ammeter 7 for the zero concentration is stable and low. As is understood from these data, the use of platinum as the common electrode, the use of copper as the electrode for measurement of total residual chlorine concentration, and the use of silver as the electrode for measurement of free residual chlorine concentration are preferable for precise measurement.

It was found that the relation between the output current between the electrodes and free residual chlorine concentration becomes very linear by grinding the surface of platinum electrode in a solution of carboxylic acid, for instance tartaric acid solution of 0.01 normal, containing glass grains. Without the above-mentioned grinding, the output current becomes saturated for a free residual chlorine concentration of above 1 ppm. However, once the platinum electrode is ground, the relation between the output current and the free residual chlorine concentration becomes linear for a wide range of from 0 to above 3 ppm of the concentration. The effect of the grinding lasts for a very long period.

Also, it is found preferable if the silver electrode Ag is treated so as to roughen its surface, one example of the treatment comprising the step of immersing and vibrating the silver electrode in a bath with Cl$^-$ ions, for instance, 400 ppm hypochlorous acid solution for about 30 minutes to form silver chloride thin film on the silver electrode, and the step of reducing the silver chloride by exposing the film in photochemical rays, for instance, of 100 Watts super high pressure mercury lamp for 2 minutes.

A gold electrode or a carbon electrode can be used in place of the platinum electrode. The gold electrode has almost same effect as the platinum electrode. However, the carbon electrode is likely to adsorb impurities, for instance organic substance, in the water and can be easily polluted.

In the aforementioned first example, all the electrodes are provided on the end part of the rod 2. However, the electrodes Cu and Ag other than the common electrode Pt need not be provided on the rod 2, but may be fixed to the inner wall of the container 1. The reason is that only the common electrode Pt needs to be driven in the water to form said thin water layer on the Pt electrode with a certain concentration gradient of $I_2$, which is necessary for the output current proportional to residual chlorine concentration.

Figure 5:
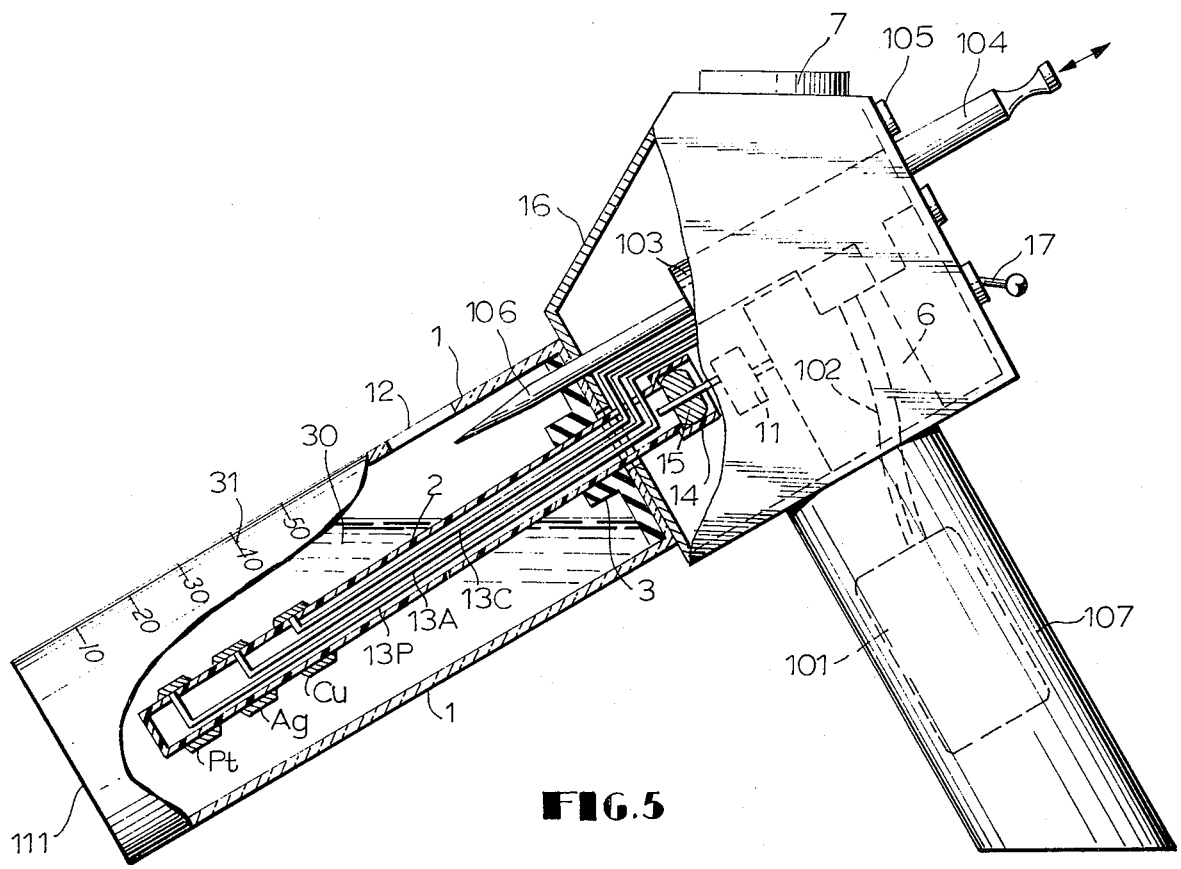
FIG. 5 is a partly sectional side view of a second example of the invention.
Figure 6:
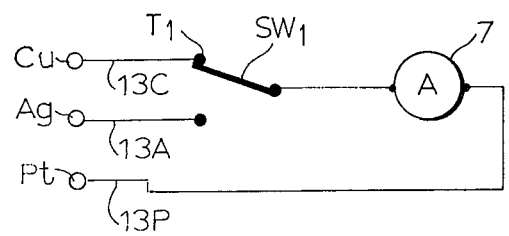
FIG. 6 is a circuit diagram of the apparatus of FIG. 6.

FIGS. 5 and 6 show another example, whereby the Amperometric titration can be made very easily.

The apparatus of the second example has similar parts corresponding to those of the first example shown by FIGS. 1 and 2. Therefore, the corresponding parts are indicated by the same numerals and letters as the aforementioned first example. The apparatus of the second example shown in FIGS. 5 and 6 excludes variable resistors VR1, VR2 and VR3, and also the second switch SW2. Instead, the second example comprises a reagent bottle 101, a hand-operated pump 103, a nozzle 106 and a digital counter 105. The pump 103 injects, for every stroke of the handle, a preset specified amount of the reagent into the water in the container 1 through the nozzle 106. The digital counter 105 is for counting the number of strokes for injections of the pump.

As the reagent, a known phenylarsenoxide solution of 0.000282 normal, 1ml of which corresponds with 0.01 mgr. of residual chlorine, is filled in the container 101.

1. Free residual chlorine concentration is measured as follows:

First, a specified volume of the water 30 is poured into the container by utilizing the scale 31 and known buffer solution containing phosphoric acid to make pH=7 is added thereto. The switch SW1 is turned to the F1 side to select the silver electrode Ag. Then, the handle 104 is repeatedly pushed while watching the ammeter 7. In the beginning, a pointing hand of the ammeter shifts its position for every injection of the reagent, and then, the pointing hand ceases its movement at a new injection. At that time the amperometric titration is over, and therefore the amount of the reagent injected into the water gives the appropriate concentration. The amount of the injected reagent, hence, the residual chlorine concentration is directly readable on the digital counter, by first selecting the stroke of the pump 103 appropriately.

2. Total residual chlorine concentration is measured almost similarly to the above-mentioned way, but the switch SW1 must be turned to T1 side, and the water 30 must be added by known Michaelis buffer solution so as to make the water pH approximately pH=4. Also, a KI solution of about 50 gr/l concentration is added.

The necessary amount of the KI solution is about 0.003 volume for 1 volume of the tested water. Other processes are similar to those of foregoing measurement of the free residual chlorine concentration.

What is claimed is:

1. An apparatus for measuring residual chlorine concentration in water, comprising:

a container for containing the water to be tested, the container being transparent to light effective for light-reduction of AgCl and having an aperture therein for pouring in and for draining out the water;

an insulator rod pivotally supported in the container by an elastic packing at one end and adapted to be conically driven with circular movement of the other end to agitate the water to be tested;

a first electrode of a metal selected from the group consisting of platinum, gold and carbon provided on the rod at the other end so as to be agitated in the water;

a second electrode of silver positioned within said container and adapted to be immersed in the water, said silver electrode having a surface of silver obtained by exposing to light a silver chloride film on the silver electrode;

a driving means operatively coupled to said insulator rod for pivotally driving the insulator rod; and an ammeter operatively coupled for indicating a galvanic current flowing between the first electrode and the second electrode.

2. The measuring device as recited in claim 1 further comprising a third electrode of copper provided on the rod, a change-over switch connecting said second and third electrodes alternatively to one end of the ammeter.

3. The apparatus of claim 1 further comprising a pair of variable resistors and a second changeover switch, which alternatively connects one of the variable resistors across both ends of the ammeter.

4. The apparatus of claim 1 wherein the container is adapted for measuring the volume of the water.

5. The apparatus of claim 1 further comprising a compensating means for eliminating temperature-dependency of the indication on the ammeter, said compensating means having a variable resistor, both end terminals of which are connected across both terminals of said ammeter and a sliding terminal connected to one of the electrodes.

6. The device of claim 1 wherein said first electrode is platinum.

* * * * *